(12) United States Patent
Kohlscheen et al.

(10) Patent No.: US 8,768,983 B2
(45) Date of Patent: Jul. 1, 2014

(54) DYNAMIC CONFIGURATION OF MULTIPLE SOURCES AND SOURCE TYPES IN A BUSINESS PROCESS

(75) Inventors: Alan Lee Kohlscheen, Longmont, CO (US); Vikas Krishna, San Jose, CA (US); Scott William Pollyea, Loveland, CO (US); Savitha Srinivasan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 180 days.

(21) Appl. No.: 11/538,673

(22) Filed: Oct. 4, 2006

(65) Prior Publication Data
US 2008/0086502 A1    Apr. 10, 2008

(51) Int. Cl.
*G06F 12/00* (2006.01)
*G06F 17/30* (2006.01)

(52) U.S. Cl.
CPC ................................. *G06F 17/30144* (2013.01)
USPC ........................................................ 707/827

(58) Field of Classification Search
USPC ................................. 707/104.1, 999.107, 827
See application file for complete search history.

(56) References Cited

U.S. PATENT DOCUMENTS

| | | | |
|---|---|---|---|
| 5,848,415 A | 12/1998 | Guck | |
| 6,034,970 A | 3/2000 | Levac et al. | |
| 6,119,137 A | 9/2000 | Smith et al. | |
| 6,130,917 A | 10/2000 | Monroe | |
| 6,940,870 B2 | 9/2005 | Hamlin | |
| 6,961,760 B2 | 11/2005 | Li et al. | |
| 2003/0061287 A1* | 3/2003 | Yu et al. | 709/205 |
| 2005/0041860 A1* | 2/2005 | Jager | 382/173 |
| 2006/0143154 A1* | 6/2006 | Jager | 707/1 |

* cited by examiner

*Primary Examiner* — Jay Morrison
(74) *Attorney, Agent, or Firm* — Steven Bennett

(57) ABSTRACT

A computer implemented method, data processing system, computer usable program code, and apparatus are provided for dynamically configuring a document sharing system. A document sharing system receives a first request to add a new image file type to the document sharing system. A configuration file is identified for the new image file type to form an identified configuration file. The new image file type is added to the identified configuration file and the identified configuration file is saved as a new configuration file. The new configuration file is used to access files without restarting or recoding the document sharing system.

6 Claims, 3 Drawing Sheets

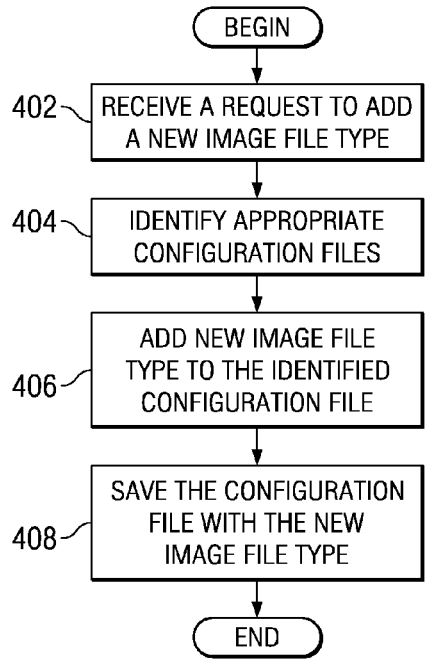

FIG. 4

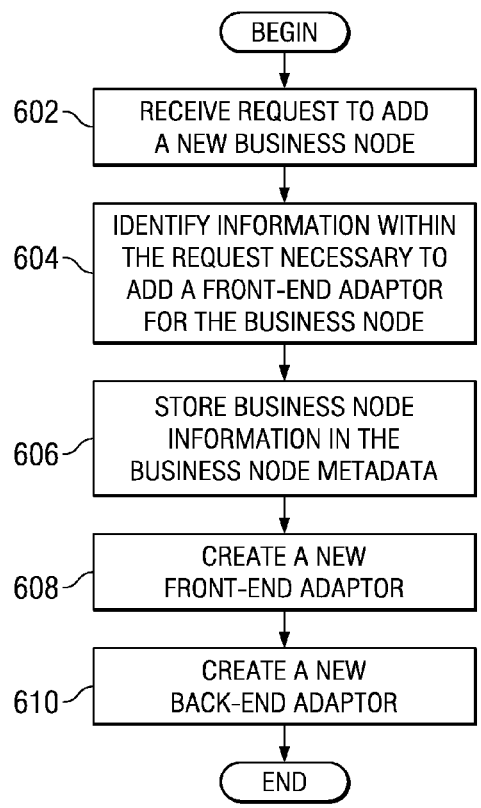

```
<?xml version="1.0" encoding="UTF-8"?>
<BUSINESS_PROCESS NAME="Broker Production Process">
    <DOCUMENT_SET NAME="Broker Production Process Docs">
        <DOCUMENT>
            <NAME>Broker</NAME>
            <REPOSITORY_TARGET>Broker</REPOSITORY_TARGET>
            <MANUAL_ENTRY_FIELDS>
                <MANUAL_ENTRY_FIELD>
                    <NAME>Airway Bill Number</NAME>
                    <REPOSITORY_TARGET_ATTR>AirwayBillNum
                    </REPOSITORY_TARGET_ATTR>
                </MANUAL_ENTRY_FIELD>
            </MANUAL_ENTRY_FIELDS>
            <ZONAL_OCR_FIELDS/>
            <ADDITIONAL_DATA_FIELDS/>
        </DOCUMENT>
    </DOCUMENT_SET>
```

DYNAMIC CONFIGURATION OF MULTIPLE SOURCES AND SOURCE TYPES IN A BUSINESS PROCESS

BACKGROUND OF THE INVENTION

1. Field of the Invention

The present invention relates generally to document sharing and retention. More specifically, the present invention is directed to a computer implemented method, data processing system, and computer usable program code for dynamic configuration of multiple sources of documents and source types in a business process.

2. Description of the Related Art

In many e-business environments, a need exists to share documents not only within a company but also between companies in order to conduct everyday business. Products such as IBM Workplace™ enable companies to work collaboratively together, using a variety of applications. A system where multiple stakeholders may participate is commonly referred to as a document-centric business process. The number of participants and the location of the participants may be dynamically manipulated in a runtime system. The document source at each stakeholder location may be one of several modalities, such as paper, facsimiles, email attachment, enterprise resource planning (ERP) applications, and web pages that may all be dynamically updated.

However, current systems lack the ability to dynamically configure an existing business process by adding or removing additional participants and document types without requiring restart or recoding of the process. The problem is exemplified in a business process, such as import compliance processes, where the number and location of stakeholders varies based on geography, supplier, freight forwarder, customs broker and importer. The ability to dynamically tie several participants into a single process backed by a common document repository without requiring customized coding or restart is a common problem.

BRIEF SUMMARY OF THE INVENTION

The different illustrative embodiments provide a computer implemented method, data processing system, computer usable program code, and apparatus for dynamically configuring a document sharing system. The illustrative embodiments receive a first request to add a new image file type to the document sharing system. The illustrative embodiments identify a configuration file for the new image file type to form an identified configuration file. The illustrative embodiments add the new image file type to the identified configuration file and save the identified configuration file as a new configuration file. The illustrative embodiments use the new configuration file to access files without restarting or recoding the document sharing system.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 illustrates a flowchart of dynamically adding a new image file type in accordance with an illustrative embodiment;

FIG. 5 illustrates an exemplary configuration file in accordance with an illustrative embodiment; and FIG. 6 illustrates a flowchart of dynamically adding a new business node in accordance with an illustrative embodiment.

DETAILED DESCRIPTION OF THE INVENTION

Figure 1:
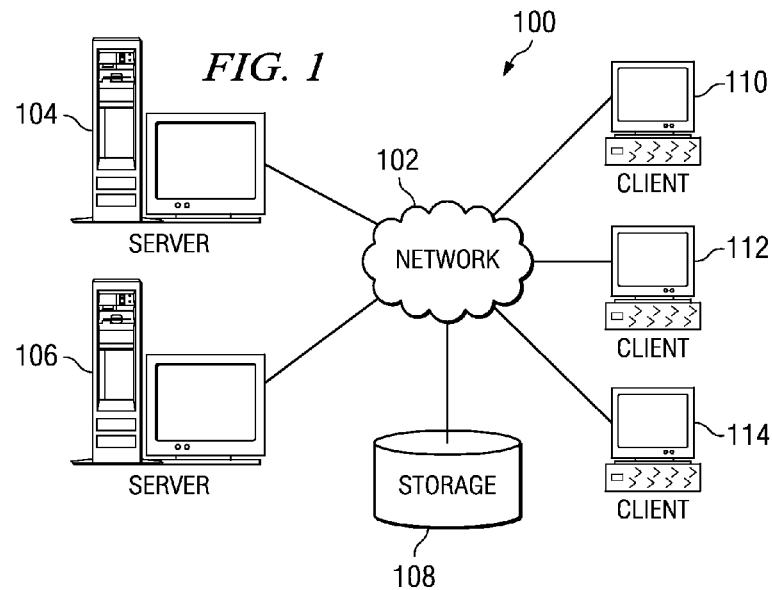
FIG. 1 depicts a pictorial representation of a network of data processing systems in which the illustrative embodiments may be implemented.
Figure 2:
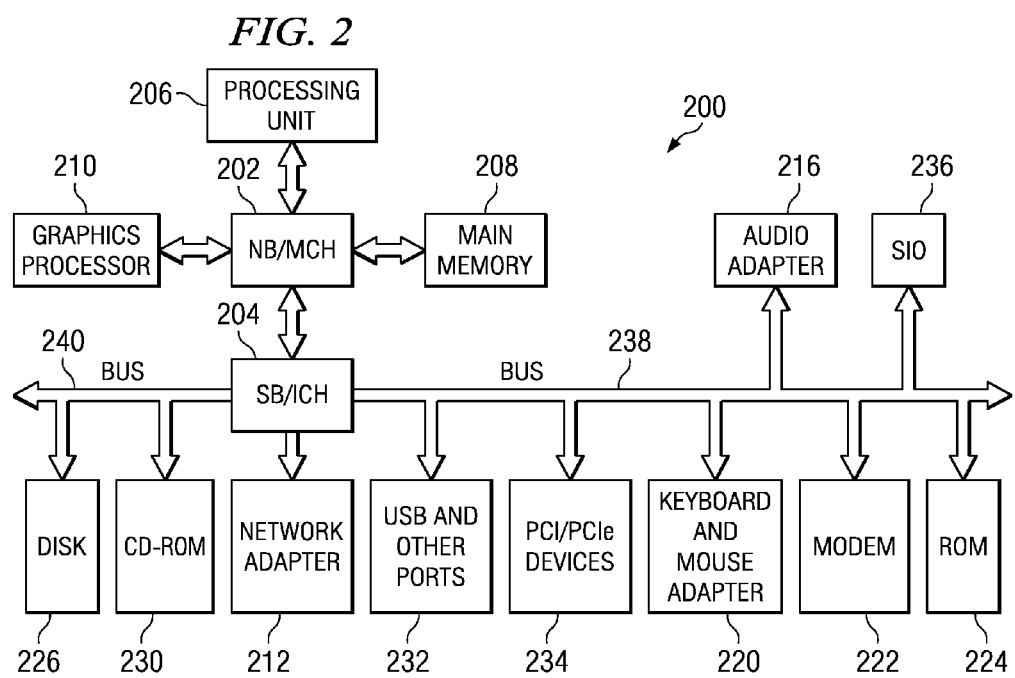
FIG. 2 shows a block diagram of a data processing system in which the illustrative embodiments may be implemented.

The illustrative embodiments provide for a computer implemented method, data processing system, and computer usable program code for dynamically configuring multiple sources of documents and source types in a business process. With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments provide a common backend repository that manages all image files and metadata associated with the business process. Each business node in the process has an on-ramp to the common back-end that can support multiple input image file types and can be configured dynamically. A business node may be a specific location within the network that captures business related data for the network. While most back-end systems are customized for a fixed number of business nodes, business logic, and image file sources, the illustrative embodiments provide for dynamically adding business nodes and image file types without the need to restart or recode the system. The ability to dynamically configure without restarting or recoding the system in a runtime environment greatly increases the flexibility and reuse of the system such that it can be applied to a broad range of processes without recoding. Thus, the illustrative embodiments provide for a system that does not require a restart of the system or any outage in the systems supporting the business problem when the process changes by adding or changing document sources, document types, or participants.

Figure 3:
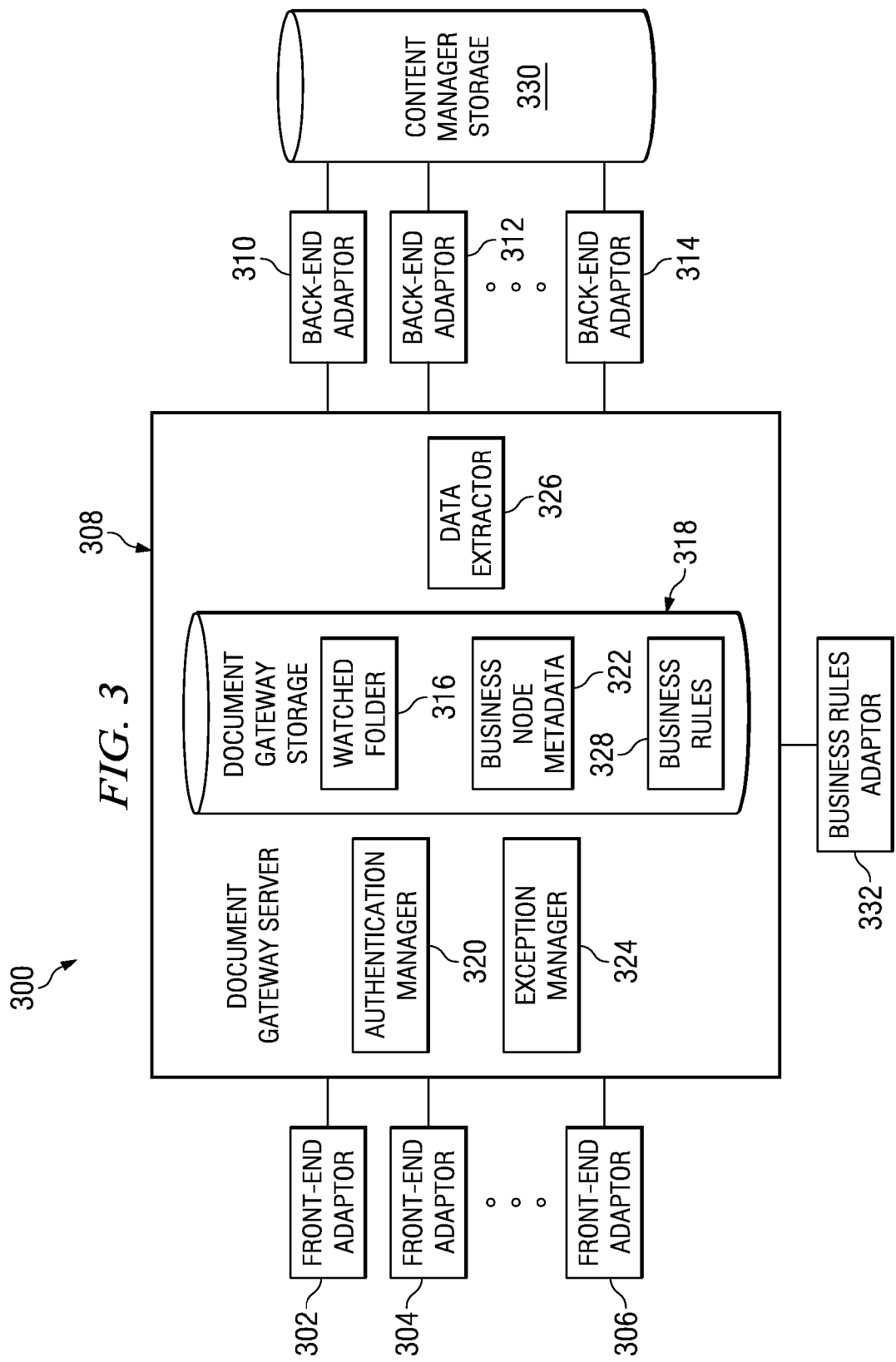
FIG. 3 illustrates a functional block diagram of the components used to implement a dynamically configured document sharing system in accordance with an illustrative embodiment.

FIG. 3 illustrates a functional block diagram of the components used to implement a dynamically configured document sharing system in accordance with an illustrative embodiment. Document sharing system 300 provides document and file sharing as an organized and simple process for a number of business nodes. While document sharing system 300 illustrates one exemplary implementation of a document sharing system, one of ordinary skill in the art would recognize that there are many different ways of implementing a document sharing system. Some components of document sharing system 300 may be combined while others may be split out into more components. In this illustrative embodiment, document sharing system 300 contains front-end adaptors 302, 304, and 306, document gateway server 308, and back-end adaptors 310, 312, and 314. Document gateway server 308 may be a server, such as server 104 or 106 of FIG. 1. Front-end adaptors 302, 304, and 306 and back-end adaptors 310, 312, and 314 may be any type of data source, such as Lexmark Document Solution Server (LDSS) data source, a Business-to-Business (B2B) data source or as simple as a facsimile.

While document sharing system 300 only shows front-end adaptors 302, 304, and 306 and back-end adaptors 310, 312, and 314, any number of front-end adaptors and back-end adaptors may exist. Front-end adaptors 302, 304, and 306 connect to watched folder 316 in document gateway server 308. Watched folder 316 acts as an entry point for front-end adaptors 302, 304, and 306 and allows front-end adaptors 302, 304, and 306 or any new input source to access document gateway server 308 by uploading an image file into watched folder 316 within document gateway storage 318 for document gateway server 308 to process. Watched folder 316 merely accepts any type of image file that is loaded via front-end adaptor 302, 304, or 306.

Business nodes who are attempting to upload an image file into watched folder 316 are authenticated as valid business nodes through authentication manager 320. The authentication that is performed is for the image file being uploaded. Front-end adaptor 302, 304, or 306 authenticates itself with an identifier and password to authentication manager 320 to be able to communicate with content manager storage 330. Authentication manager 320 uses stored business node metadata 322 to validate business nodes accessing document gateway server 308 for verification of received image files and any metadata extracted from them. If an invalid business node is attempting to access document gateway server 308, authentication manager 320 sends an error or exception to the business node through exception manager 324.

When an image file is received in watched folder 316, data extractor 326 extracts the metadata from the image file. Data extractor 326 examines the image file and uses logical optical character recognition (OCR) to extract the metadata from the image file. Once the metadata is extracted, it is automatically associated with the image file. One of back-end adaptors 310, 312, or 314 which are associated with the type of image file being processed, processes the image file so that the resulting metadata and image file may be stored on content manager storage 330. Storing the resulting metadata of the document on content manager storage 330, allows for the metadata to be accessed by another one of back-end adaptors 310, 312, or 314 when the metadata is requested by another business node. Different document types may be added to business rules 328 through business rules adaptor 332. A new document type may be added manually through business node interaction through business rules adaptor 332.

Since business rules and business nodes are added to the document gateway server through the use of business rules adaptor 332, the only files being updated are configuration files within business rules 328. Since configuration files are not application files, document gateway server 308 does not require restarting or recoding in order to access the files. By virtue of the loose integration between document gateway server 308 and any of front-end adaptors 302, 304, or 306, that is, by front-end adaptors 302, 304, and 306 uploading an image file to watched folder 316, any new front-end adaptor may start dropping image files into watched folder 316, which a daemon within document gateway server 308 picks up. Loose integration means that front-end adaptors 302, 304, or 306 only has to drop image files into watched folder 316 and no code level integration is required. By uploading image files in this manner, no need exists to restart document gateway server 308 any time a new front-end adaptor is introduced. On the back-end, document gateway server 308 uses a dynamic class loading feature of the Java™ programming language to dynamically load a new back-end adaptor without having to programmatically integrate the new back-end adaptor with document gateway server 308 and without having to restart or recode document gateway server 308. Thus, document sharing system 300 allows the dynamic addition of business nodes and image file types so that any business node may upload and access any type of metadata regardless of the system the business node is using.

FIG. 4 illustrates a flowchart of dynamically adding a new image file type in accordance with an illustrative embodiment. The new image file type is added using a business rules adaptor, such as business rules adaptor 332 of FIG. 3.

As the operation begins, the document gateway server receives a request through the business rules adaptor to add a new image file type to be processed by a document gateway server (step 402). Next, the document gateway server identifies the appropriate configuration files stored in the business rules on the document gateway server (step 404). The configuration files may be any type of configuration file, such as an Extensible Markup Language (XML) file. The document gateway server then adds the new image file type to the identified configuration file (step 406). FIG. 5 shows exemplary configuration file 500 in accordance with an illustrative embodiment. Returning to FIG. 4, the document gateway server saves the configuration file with the new image file type (step 408), with the operation terminating thereafter and recycles itself with the new configuration loaded. Since configuration files are not application files, the document gateway server does not require restarting or recoding in order to access the files.

FIG. 6 illustrates a flowchart of dynamically adding a new business node in accordance with an illustrative embodiment. The new business node is added using a business rules adaptor, such as business rules adaptor 332 of FIG. 3.

As the operation begins, the business rules adaptor receives a request to add a business node to the document gateway server (step 602). Next, the business rules adaptor identifies the appropriate information within the request in order to create a new front-end adaptor for the business node (step 604). The business rules adaptor then stores the necessary business node information in the business node metadata (step 606). The business rules adaptor creates a new front-end adaptor which will be able to upload image files to the watched folder (step 608). The business rules adaptor then creates a new back-end adaptor (step 610) that will process the information received from the new front-end adaptor into the content manager storage, with the operation terminating thereafter.

By virtue of the loose integration between the document gateway server and any front-end adaptor, that is, by the front-end adaptors uploading an image file to the watched folder, any new front-end adaptor may start dropping image files into a watched folder, which a daemon within the document gateway server picks up. By uploading image files in this manner, no need exists to restart the document gateway server any time a new front-end adaptor is introduced. On the back-end, the document gateway server uses a dynamic class loading feature of the Java™ programming language to dynamically load a new back-end adaptor without having to programmatically integrate the new back-end adaptor with the document gateway server and without having to restart or recode the document gateway server.

Thus, the illustrative embodiments provide a common back-end repository that manages all image files and metadata associated with the business process. The illustrative embodiments receive a first request to add a new image file type to the document sharing system and identify a configuration file for the new image file type to form an identified configuration file. The illustrative embodiments add the new image file type to the identified configuration file and save the identified configuration file as a new configuration file. Then, the illustrative embodiments use the new configuration file to access files without restarting or recoding the document sharing system.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for dynamically configuring a document sharing system, the computer implemented method comprising:

receiving a first request to add a new image file to a business rules component in the document sharing system including a content manager storage and a document gateway server that has a document gateway storage of which the business rules component is a part, wherein the first request comprises the new image file to be added to the business rules component;

examining the new image file using logical optical character recognition to extract metadata about the new image file from the new image file;

responsive to extracting the metadata from the new image file, identifying a configuration file;

adding the extracted metadata from the new image file to the identified configuration file;

saving the identified configuration file as a new configuration file, wherein the new configuration file is stored in the business rules component;

using the new configuration file to access files without restarting or recoding the document sharing system;

receiving a second request to add a business node to a business rules component in the document sharing system, wherein the request comprises business node metadata;

identifying the business node metadata within the second request in order to create a new front-end adaptor and a new back-end adaptor, wherein the business node metadata identifies a location within a network that captures data for the network, the new front-end adaptor being a data source that uploads an image file to a watched folder of the document gateway storage of the document gateway server;

creating the new front-end adaptor; and creating the new back-end adaptor, wherein the new back-end adaptor detects the image file has been uploaded by to the watched folder, and responsively processes the image file and stores the image file as processed to a content manager storage to which the new back-end adaptor is connected, wherein the document gateway server is not directly connected to the content manager storage but rather is indirectly connected to content manager storage via the new back-end adaptor, the new front-end adaptor and the new back-end adaptor each directly connected to the document gateway server, the new back-end adaptor not being able to upload any image file to the watched folder, the new front-end adaptor not being able to process any image file that has been uploaded to the watched folder.

2. The computer implemented method of claim 1, wherein the configuration file is an Extensible Markup Language file.

3. A data processing system comprising:

a bus system;

a communications system connected to the bus system;

a memory connected to the bus system, wherein the memory includes a set of instructions; and a processing unit connected to the bus system, wherein the processing unit executes the set of instructions to receive a first request to add a new image file to a business rules component in the document sharing system including a content manager storage and a document gateway server that has a document gateway storage of which the business rules component is a part, wherein the first request comprises the new image file to be added to the business rules component; examine the new image file using logical optical character recognition to extract metadata about the new image file from the new image file; identify a configuration file responsive to extracting the metadata from the new image file; add the extracted metadata from the new image file to the identified configuration file; save the identified configuration file as a new configuration file in the memory, wherein the new configuration file is stored in the business rules component; and use the new configuration file to access files without restarting or recoding the document sharing system;

and wherein the processing unit further executes the set of instructions to receive a second request to add a business node to a business rules component in the document sharing system, wherein the request comprises business node metadata; identify the business node metadata within the second request in order to create a new front-end adaptor and a new back-end adaptor, the new front-end adaptor being a data source that uploads an image file to a watched folder of the document gateway storage of the document gateway server, wherein the business node metadata identifies a location within a network that captures data for the network; create the new front-end adaptor; and create the new back-end adaptor, wherein the new back-end adaptor detects the image file has been uploaded by to the watched folder, and responsively processes the image file and stores the image file as processed to a content manager storage to which the new back-end adaptor is connected, wherein the document gateway server is not directly connected to the content manager storage but rather is indirectly connected to content manager storage via the new back-end adaptor, the new front-end adaptor and the new back-end adaptor each directly connected to the document gateway server, the new back-end adaptor not being able to upload any image file to the watched folder, the new front-end adaptor not being able to process any image file that has been uploaded to the watched folder.

4. The data processing system of claim 3, wherein the configuration file is an Extensible Markup Language file.

5. A computer program product comprising a computer storage-type medium storing executable instructions for dynamically configuring a document sharing system, the computer program product comprising:

computer usable program code for receiving a first request to add a new image file to a business rules component in the document sharing system including a content manager storage and a document gateway server that has a document gateway storage of which the business rules component is a part, wherein the first request comprises the new image file to be added to the business rules component;

computer usable program code for examining the new image file using logical optical character recognition to extract metadata about the new image file from the new image file;

computer usable program code for responsive to extracting the metadata from the new image file, identifying a configuration file;

computer usable program code for adding the extracted metadata from the new image file to the identified configuration file;

computer usable program code for saving the identified configuration file as a new configuration file, wherein the new configuration file is stored in the business rules component;

computer usable program code for using the new configuration file to access files without restarting or recoding the document sharing system;

computer usable program code for receiving a second request to add a business node to a business rules component in the document sharing system, wherein the request comprises business node metadata;

computer usable program code for identifying the business node metadata within the second request in order to create a new front-end adaptor and a new back-end adaptor, wherein the business node metadata identifies a location within a network that captures data for the network, the new front-end adaptor being a data source that uploads an image file to a watched folder of the document gateway storage of the document gateway server;

computer usable program code for creating the new front-end adaptor; and computer usable program code for creating the new back-end adaptor, wherein the new back-end adaptor detects the image file has been uploaded by to the watched folder, and responsively processes the image file and stores the image file as processed to a content manager storage to which the new back-end adaptor is connected, wherein the document gateway server is not directly connected to the content manager storage but rather is indirectly connected to content manager storage via the new back-end adaptor, the new front-end adaptor and the new back-end adaptor each directly connected to the document gateway server, the new back-end adaptor not being able to upload any image file to the watched folder, the new front-end adaptor not being able to process any image file that has been uploaded to the watched folder.

6. The computer program product of claim 5, wherein the configuration file is an Extensible Markup Language file.

* * * * *